US011510245B2

(12) United States Patent
Dass et al.

(10) Patent No.: US 11,510,245 B2
(45) Date of Patent: Nov. 22, 2022

(54) THREAD BOOST MODE FOR CARRIER-SENSE MULTIPLE ACCESS/CARRIER AGGREGATION (CSMA/CA)

(71) Applicant: Apple Inc., Cupertino, CA (US)

(72) Inventors: Yaranama Venkata Ramana Dass, Belmont, CA (US); Assaf Porat, Herzliya (IL); Oren Shani, Saratoga, CA (US); Venkateswara Rao Manepalli, San Jose, CA (US); Paul V. Flynn, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/239,339

(22) Filed: Apr. 23, 2021

(65) Prior Publication Data

US 2022/0346142 A1 Oct. 27, 2022

(51) Int. Cl.
*H04W 74/08* (2009.01)
*H04W 84/18* (2009.01)
(Continued)

(52) U.S. Cl.
CPC ......... *H04W 74/0808* (2013.01); *G16Y 10/75* (2020.01); *H04W 84/18* (2013.01)

(58) Field of Classification Search
CPC ... G16Y 10/75; G16Y 40/10; H04W 74/0808; H04W 84/18
See application file for complete search history.

(56) References Cited

U.S. PATENT DOCUMENTS 10,104,691 B2  10/2018  Li et al.
10,361,835 B2   7/2019  Guo et al.
(Continued)

FOREIGN PATENT DOCUMENTS

CN    106464434 A  *  2/2017  ........... H04L 1/0025
CN    106686745 A  *  5/2017  ........... H04B 17/318
(Continued)

OTHER PUBLICATIONS

Texas Instruments, 'CE Regulations for SRDs Operating in License-Free 2.4 GHz/5 GHz Bands' (Apr. 2020), available at: https://www.ti.com/lit/an/swra670/swra670.pdf?ts=1602402189522&ref_url=https%253A%252F%252Fwww.google.com%252F; 70 pages.
(Continued)

*Primary Examiner* — Ahmed Elallam
(74) *Attorney, Agent, or Firm* — Sterne, Kessler, Goldstein & Fox P.L.L.C.

(57) ABSTRACT

An approach is described for a wireless device comprising a transceiver and a processor communicatively coupled to the transceiver. The processor is configured to detect a packet for transmission; scan, using the transceiver, a channel during an initial sliding window, the initial sliding window having N symbol durations; determine a power distribution of the initial sliding window based on the channel scan; determine that the channel is occupied during a first time period of the initial sliding window based at least on the power distribution; and determine a second sliding window having a second time period and a third time period. The second time period overlaps with the initial sliding window and a length of the third time period is determined based at least on the power distribution. The processor is further configured to scan, using the transceiver, the channel during the third time period; determine that the channel is idle during the third time period of the second sliding
(Continued)

window; and transmit, using the transceiver, the packet to a second wireless device on the channel responsive to the third time period being idle.

20 Claims, 9 Drawing Sheets

(51) Int. Cl.
*G16Y 40/10* (2020.01)
*G16Y 10/75* (2020.01)

(56) References Cited

U.S. PATENT DOCUMENTS

| | | | |
|---|---|---|---|
| 10,455,623 B2 | 10/2019 | Yang et al. | |
| 10,524,239 B2 | 12/2019 | Ahn et al. | |
| 10,742,265 B2* | 8/2020 | Sergi | H04W 74/0808 |
| 11,019,663 B2* | 5/2021 | Noh | H04W 74/0825 |
| 2011/0109471 A1 | 5/2011 | Park et al. | |
| 2015/0334744 A1 | 11/2015 | Ji et al. | |
| 2018/0176820 A1 | 6/2018 | DenBoer et al. | |
| 2018/0310340 A1 | 10/2018 | Noh et al. | |
| 2019/0116615 A1 | 4/2019 | Harada et al. | |
| 2019/0174546 A1 | 6/2019 | Jeon et al. | |
| 2019/0191458 A1 | 6/2019 | Wu et al. | |
| 2019/0296790 A1 | 9/2019 | Ye et al. | |
| 2020/0084812 A1* | 3/2020 | Salem | H04W 76/14 |
| 2020/0288380 A1* | 9/2020 | Karaki | H04W 74/0816 |
| 2022/0174735 A1* | 6/2022 | Li | H04W 16/14 |

FOREIGN PATENT DOCUMENTS

| | | |
|---|---|---|
| CN | 105636233 B | 11/2018 |
| CN | 110381558 B | 9/2020 |
| JP | 6554857 B2 | 8/2019 |
| KR | 20180039501 A * | 4/2018 |
| SG | 10201708696 A1 | 5/2019 |
| WO | 2020/201490 A1 | 10/2020 |

OTHER PUBLICATIONS

Babaei, Alireza et al., 'Overview of EU LBT and its Effectiveness for Coexistence of LAA LTE and Wi-Fi' (Nov. 4, 2014), available at: https://mentor.ieee.org/802.19/dcn/14/19-14-0082-00-0CUB-overview-of-eu-lbt-and-its-effectiveness-for-coexistence-of-laa-ite-and-wi-fi.pptx; 11 pages.

Nordic Semiconductors, 'nRF52811 Product Specification V1' (Feb. 26, 2019), available at: https://www.nordicsemi.com/-/media/DocLib/Other/product_Spec/nRF52811PSv10pdf.pdf; 444 pages.

NXP Semiconductors, 'Thread Large Network' (Dec. 2017), available at: https://www.nxp.com/docs/en/application-note/AN12099.pdf; 18 pages.

Casilari et al., 'Modeling of Current Consumption in 802.15.4/ZigBee Sensor Motes' (Sensors, Apr. 2010), available at: https://www.mdpi.eom/1424-8220/10/6/5443/pdf; 26 pages.

Cascoda, 'IEEE 802.15.4 Transceiver CA-8211' (Rev. 1.0, Jan. 2019), available at: https://www.cascoda.com/wp-content/uploads/2019/06/CA-8211_datasheet_0119.pdf; 48 pages.

Leonardi et al., 'Simulative assessments of the IEEE 802.15.4 CSMA/CA with Priority Channel Access in Structural Health Monitoring scenarios' (IEEE, Jul. 2017), available at: https://ieeexplore.ieee.org/document/8104801; 6 pages.

Lan et al., 'Latency Analysis of Wireless Networks for Proximity Services in Smart Home and Building Automation: The Case of Thread', (IEEE vol. 7, Dec. 2018), available at: https://ieeexpiore.ieee.org/document/8586865?denied; 12 pages.

* cited by examiner

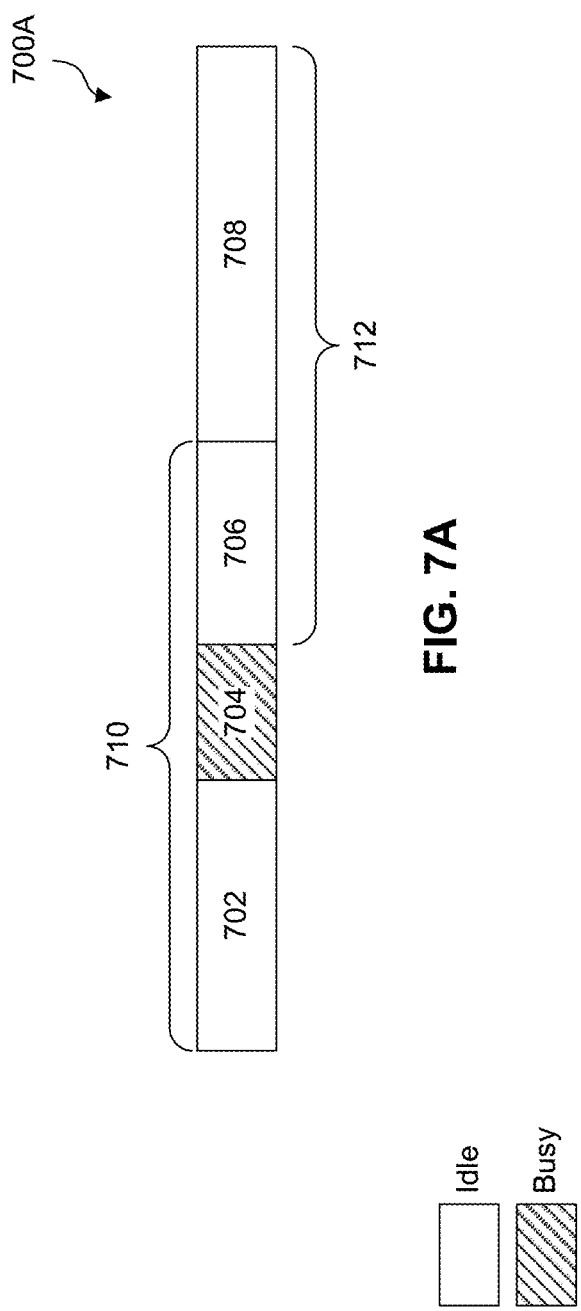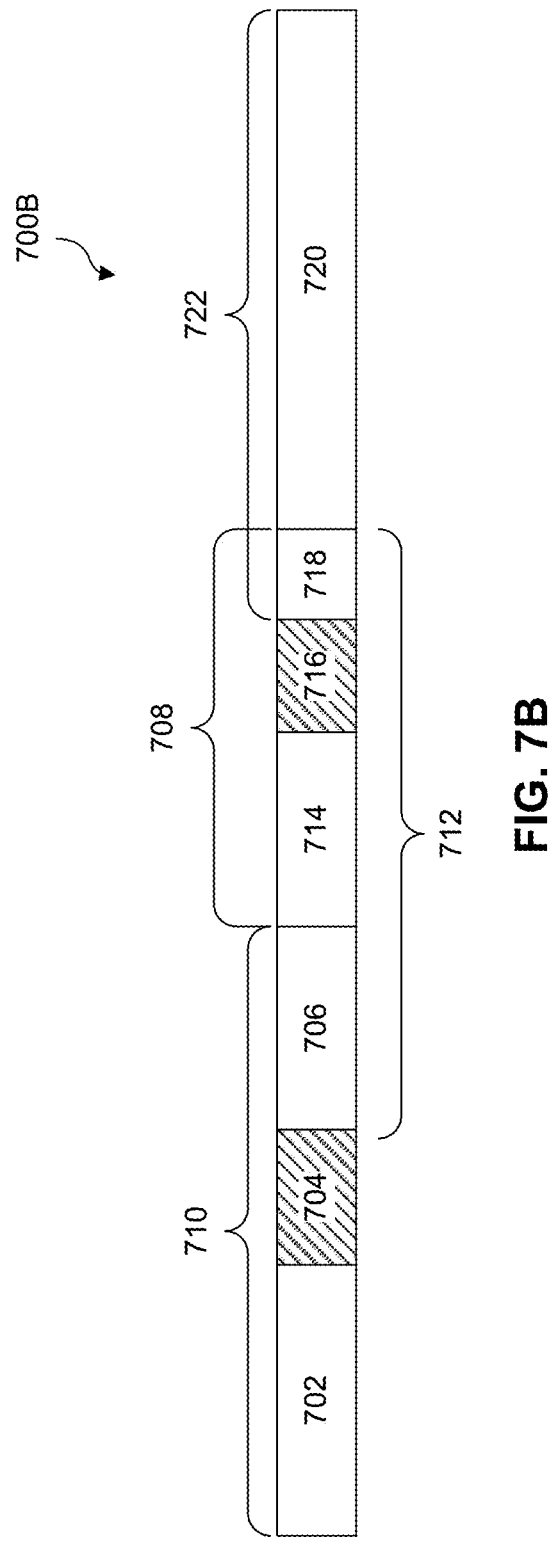

THREAD BOOST MODE FOR CARRIER-SENSE MULTIPLE ACCESS/CARRIER AGGREGATION (CSMA/CA)

BACKGROUND

Field

The described aspects generally relate to an enhancement on thread networks.

Related Art

A wireless network such as an internet of things (IoT) network may include a massive number of devices, such as sensors, actuators, wearable devices, security appliances, smart home devices, etc. Thread network technology improves the wireless network by connecting the devices in the wireless network, such as IoT devices, with robust and energy-efficient communication links.

SUMMARY

Some aspects of this disclosure relate to apparatuses and methods for implementing an enhancement on a thread network. For example, systems and methods are provided for implementing carrier-sense multiple access and carrier aggregation of thread devices in the thread network.

Some aspects of this disclosure relate to a wireless device comprising a transceiver and a processor communicatively coupled to the transceiver. The processor is configured to detect a packet for transmission; scan, using the transceiver, a channel during an initial sliding window, the initial sliding window having N symbol durations; determine a power distribution of the initial sliding window based on the channel scan; determine that the channel is occupied during a first time period of the initial sliding window based at least on the power distribution; and determine a second sliding window having a second time period and a third time period. The second time period overlaps with the initial sliding window and a length of the third time period is determined based at least on the power distribution. The processor is further configured to scan, using the transceiver, the channel during the third time period; determine that the channel is idle during the third time period of the second sliding window; and transmit, using the transceiver, the packet to a second wireless device on the channel responsive to the third time period being idle.

Some aspects of this disclosure relate to the thread device, wherein the power distribution includes a signal strength of the channel for each of the N symbol durations.

Some aspects of this disclosure relate to the thread device, wherein the processor is further configured to determine that the channel is occupied during the first time period by determining that a signal strength of at least one of symbol durations of the first time period is above a threshold.

Some aspects of this disclosure relate to the thread device, wherein a signal strength of a last symbol duration of the first time period is above the threshold.

Some aspects of this disclosure relate to the thread device, wherein the processor is further configured to determine the third time period by: determining the second time period based on the power distribution of the initial sliding window, wherein the second time period has M continuous symbol durations within the initial sliding window having signal strengths that are lower than or equal to a threshold; and determining the third time period to be N-M continuous symbol durations following the second time period.

Some aspects of this disclosure relate to the thread device, wherein the M continuous symbol durations include a last symbol duration of the initial sliding window.

Some aspects of this disclosure relate to the thread device, wherein the processor is further configured to determine that the channel is idle during the third time period by determining that signal strengths of each symbol durations in the third time period are lower than or equal to a threshold.

Some aspects of this disclosure relate to the thread device, wherein N is 12 and each of the N symbol durations is 16 us.

Some aspects of this disclosure relate to a method of a wireless device. The method includes detecting a packet for transmission; scanning, using the transceiver, a channel during an initial sliding window, the initial sliding window having N symbol durations; determining a power distribution of the initial sliding window based on the channel scan; determining that the channel is occupied during a first time period based at least on the power distribution; and determining a second sliding window having a second time period and a third time period. The second time period overlaps with the initial sliding window and a length of the third time period is determined based at least on the power distribution. The method further includes scanning, using the transceiver, the channel during the third time period; determining that the channel is idle during the third time period of the second sliding window; and transmitting, using the transceiver, the packet to a second wireless device on the channel responsive to the third time period being idle.

Some aspects of this disclosure relate to the method, wherein the power distribution includes a signal strength of the channel for each of the N symbol durations.

Some aspects of this disclosure relate to the method, wherein the determining that the channel is occupied during the first time period further comprises determining that a signal strength of at least one of symbol durations of the first time period is above a threshold.

Some aspects of this disclosure relate to the method, wherein a signal strength of a last symbol duration of the first time period is above the threshold.

Some aspects of this disclosure relate to the method, wherein the determining the third time period further comprises: determining the second time period based on the power distribution of the initial sliding window, wherein the second time period has M continuous symbol durations within the initial sliding window having signal strengths that are lower than or equal to a threshold; and determining the third time period to be N-M continuous symbol durations following the second time period.

Some aspects of this disclosure relate to the method, wherein the M continuous symbol durations include a last symbol duration of the initial sliding window.

Some aspects of this disclosure relate to the method, wherein the determining that the channel is idle during the third period comprises determining that signal strengths of each symbol durations in the third time period are lower than or equal to a threshold.

Some aspects of this disclosure relate to the method, wherein N is 12 and each of the N symbol durations is 16 us.

Some aspects of this disclosure relate to a non-transitory computer-readable medium storing instructions that, when executed by a processor of an electronic device, cause the processor to perform operations, the operations including: detecting a packet for transmission; scanning, using the transceiver, a channel during an initial sliding window, the initial sliding window having N symbol durations; determining a power distribution of the initial sliding window based on the channel scan; determining that the channel is occupied during a first time period of the initial sliding window based at least on the power distribution; determining a second sliding window having a second time period and a third time period. The second time period overlaps with the initial sliding window and a length of the third time period is determined based at least on the power distribution. The operations further includes scanning, using the transceiver, the channel during the third time period; determining that the channel is idle during the third time period of the second sliding window; and transmitting, using the transceiver, the packet to a wireless device on the channel responsive to the third time period being idle.

Some aspects of this disclosure relate to the computer-readable medium, wherein the power distribution includes a signal strength of the channel for each of the N symbol durations.

Some aspects of this disclosure relate to a non-transitory computer-readable medium, wherein the determining third time period further comprises: determining the second time period based on the power distribution of the initial sliding window, wherein the second time period has M continuous symbol durations within the initial sliding window having signal strengths that are lower than or equal to a threshold; and determining the third time period to be N-M continuous symbol durations following the second time period.

Some aspects of this disclosure relate to a non-transitory computer-readable medium, wherein the M continuous symbol durations include a last symbol duration of the initial sliding window.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

FIGS. 7A and 7B illustrate examples of the thread device adjusting position of a sliding window, according aspects of the disclosure.

Figure 1:
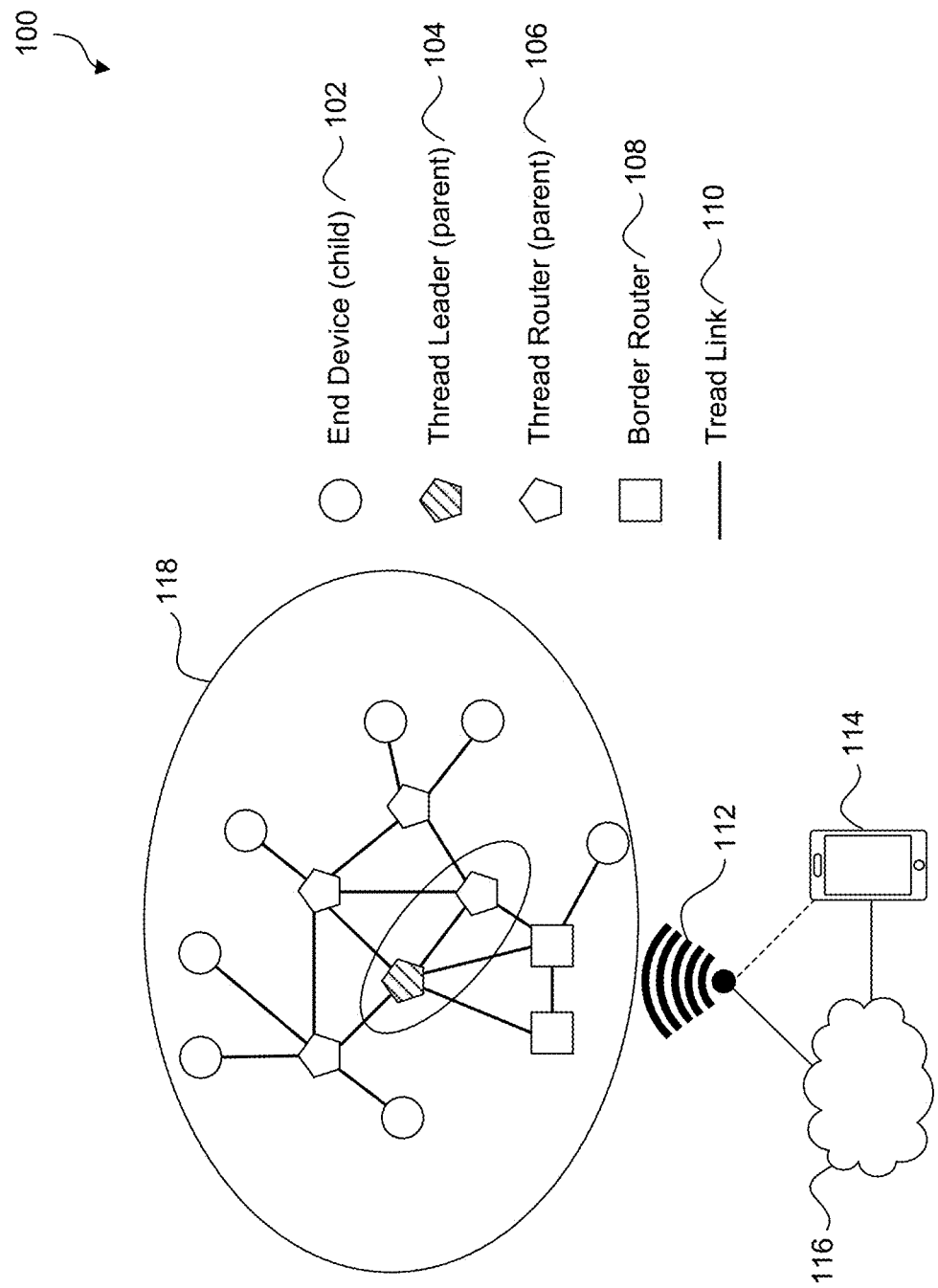
FIG. 1 illustrates an example system implementing a communication network including a thread network, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing enhancements of a thread network. For example, systems and methods are provided for implementing carrier-sense multiple access and carrier aggregation of thread devices of the thread network.

According to some aspects, a communication network, such as an internet of things (IoT) network, may include a number of communication devices, such as sensors, actuators, wearable devices, security appliances, smart home devices, etc. In some aspects, the communication devices are wireless devices. For example, the smart home devices are connected to and controlled by a smart home controlling device via one or more home networks. Because the smart home devices may locate in different places and move around in a home, wireless connections are more suitable. In addition, when a new smart home device needs to be connected to a home network, a wireless connection is easy to setup. For another example, sensors may be small-sized devices deployed in an area to monitor temperature, moisture level, sun-light level, or other parameters of the area. In such a case, wireless devices are cost-efficient and easy to deploy.

According to some aspects, the communication devices may operate on a set of shared channels, such as unlicensed channels around 900 MHz or 2.4 GHz. For example, the smart home devices can operate on channels around 2.4 GHz. Because the unlicensed channels are not dedicated to specific communication devices, any communication devices may have opportunities to transmit or receive on the unlicensed channels. However, as a number of the communication devices in an area increases, conflicts can arise between the communication devices that transmit at the same time.

According to some aspects, before transmitting signals, the communication devices scan the unlicensed channels to check whether the unlicensed channels are idle. For example, a smart home device performs clear channel assessment (CCA) checks on an unlicensed channel. If signal strengths of the unlicensed channel are lower than a threshold, the smart home device determines that the unlicensed channel is idle and proceeds to transmit. Otherwise, the smart home device determines that the unlicensed channel is occupied and halts transmission.

According to some aspects, the communication devices include thread devices. The thread devices may include sensors, actuators, wearable devices, security appliances, smart home devices, etc. The thread devices may communicate with other thread devices and other communication devices on the unlicensed channels. In some aspects, the thread devices also perform CCA checks on the unlicensed channels that the thread devices intend to use. A thread device may determine that an unlicensed channel is occupied based on a signal strength of the unlicensed channel obtained in a first CCA check. In such a case, the thread device waits a back-off period before performing a second CCA check. After performing the second CCA check, the thread device may determine that the unlicensed channel is idle and perform transmission on the unlicensed channel. Otherwise, the thread device determines that the unlicensed channel is still occupied. In such a case, the thread device repeats waiting back-off periods and CCA checks until the unlicensed channel becomes idle.

According to some aspects, a back-off period is generated within a time duration range. The time duration range may be between 0 and a maximum value. For example, the time duration range may be between 0 ms and 2.24 ms, wherein the maximum value is 2.24 ms. The maximum value increases as a number of CCA checks on the unlicensed channel increases. For example, the maximum value before the first CCA check is 2.24 ms; the maximum value after the first CCA check increases to 4.8 ms; and the maximum value after the second CCA check increases to 9.92 ms. In some aspects, the maximum value may stop increasing after a predefined number of CCA checks. For example, in embodiments, the predefined number of CCA checks is 3, and thus the maximum value remains to be 9.92 ms after a third CCA check.

According to some aspects, the thread device considers a number of CCA checks as a medium access control (MAC) layer retry. The thread device determines that the MAC layer retry fails if the unlicensed channel is occupied after the number of CCA checks. For example, the thread device may determine that the channel is occupied in all CCA checks in the MAC layer retry. In such a case, the thread device may initiate a second MAC layer retry. In some aspects, the thread device may initiate a predefined number of MAC layer retries before abandoning a transmission.

According to some aspects, the communication devices may include Wi-Fi devices and Bluetooth devices, which also operate on the unlicensed channels. Therefore, the thread devices compete with the Wi-Fi and the Bluetooth devices for accessing the unlicensed channels. In some aspects, the thread device may increase the predefined number of MAC layer retries to improve chances of successful transmission. The thread device may also adjust the maximum value of the back-off periods.

According to some aspects, the thread device may implement a sliding window CCA check to improve the chances of successful transmission. The sliding window CCA check requires the channel to be idle in a sliding window duration. The size of the sliding window duration is predetermined. However, the location of the sliding window duration is flexible. In some aspects, the sliding window duration is a continuous duration. For example, the thread device performs a CCA check in a first period of time, wherein the first period of time is N symbol durations. Here, the location of the sliding window duration is the first period of time and the size of the sliding window duration is N symbol durations. The thread device may determine that the channel is occupied in the first period of time by determining that signal strength during at least one symbol duration in the first period of time is above a threshold. This indicates that other communication devices have transmitted in the at least one symbol duration. The thread device then determines a second period of the time that starts within the first period of time. In some aspects, the second period of time is a tail idle duration of the first period of time.

For example, if transmissions of the other devices only take place in a $5^{th}$ symbol duration of N symbol durations in the first period of time, then the second period of time starts from a beginning of a $6^{th}$ symbol duration and ends at the Nth symbol duration of the first period of time. As described above, the transmission requires the channel to be idle for N symbol durations. Because the second period of time is part of the first period of time, which has N total symbol durations, additional CCA checks are needed. Assuming the second period of time has M symbol durations, the transmission still requires N-M additional symbol durations to be idle during a third period of time. Accordingly, the thread device determines the third period of time following the Nth symbol duration of the first period of time. It is worth noting that the Nth symbol duration of the first period of time is also the Mth symbol duration of the second period of time. The thread device may determine that the channel is idle in the third period of time by determining that signal strengths of each N-M symbol durations are below the threshold. In such a case, the location of the sliding window duration is a combination of the second and the third periods of time, to reach the required total of N idle symbol durations. Accordingly, the thread device can perform the transmission because the channel is idle in the sliding window duration including the second and the third periods of time.

According to some aspects, the communication devices require a receiving/transmitting (RX/TX) gap when switching between receiving and transmitting. For example, the RX/TX gap may be K symbol durations. When a communication device finishes receiving, the communication device waits at least K symbol durations before performing transmission. In addition, when the communication device finishes transmission, the communication device waits at least K symbol durations before performing receiving. In some aspects, the thread device does not know locations of RX/TX gaps of other communication devices. However, the thread device may unintentionally perform CCA checks in the RX/TX gap of another communication device. For example, the sliding window duration may overlap with the RX/TX gap of the other communication device. Because the communication device does not perform transmission or receiving in the RX/TX gap, the thread device may determine that the channel is idle. In such a case, the thread device may start transmission after the sliding window duration. At the same time, the communication device may also resume transmission after the RX/TX gap. Consequently, the transmissions of the thread device and the communication device may collide, which results in a corrupted transmission or a transmission failure for both the thread device and the communication device.

According to some aspects, to avoid a collision described above, the sliding window duration is set to be greater than or equal to the RX/TX gap, e.g., N>=K. In this way, it is less likely that the sliding window duration fully overlaps with the RX/TX gap. For example, if the RX/TX gap is 192 us, the size of the sliding window duration is at least 192 us.

FIG. 1 illustrates an example system 100 implementing a communication network including a thread network 118, according to some aspects of the disclosure. Example system 100 is provided for the purpose of illustration only and does not limit the disclosed aspects. System 100 may include, but is not limited to, an access point 112, a user equipment (UE) 114, an internet 116, and the thread network 118 including one or more end devices 102, one or more thread leader devices 104, one or more thread routers 106, and one or more border routers 108. Devices in the thread network 118 are connected via thread links 110. The devices in the thread network 118, such as the one or more end devices 102, the one or more thread leader devices 104, the one or more thread routers 106, and the one or more border routers 108, may include electronic devices configured to operate using one or more institute of electrical and electronics engineers (IEEE) 802.15 standards, such as IEEE 802.15.4 standard supporting ZigBee and Z-Wave, IEEE 802.15.1 standard supporting Bluetooth, etc. The electronic devices may also be configured to operate using other wireless standards, such as IEEE 802.11. The electronic devices may include, but are not limited to, wireless communication devices, home entertainment devices, smartphones, laptops, desktops, tablets, personal assistants, monitors, televisions, wearable devices, Internet of Things (IoT) devices, vehicle communication devices, and the like.

According to some aspects, an end device 102 communicates primarily with a thread router 106. For example, the end device 102 directly transmits packets to and receives packets from the thread router 106. The end device 102 communicates with other devices in the thread network 118 or devices outside the thread network 118 via the thread router 106. In some aspects, the end device 102 is a low power device. The end device 102 may disable its transmission and receiving to reduce power consumption.

According to some aspects, the thread router 106 forwards packets for other devices in the thread network 118. For example, the thread router 106 receives a packet from the end device 102 and forwards the packet to a second end device 102 or a second thread router 106. The thread router 106 keeps its transmission and receiving enabled at all times.

According to some aspects, a thread leader device 104 also forwards packets for other devices in the thread network 118 in a similar way as the thread router 106 as described above. For example, the thread leader device 104 receives a packet from the thread router 106 and forwards the packet to the second thread router 106. In some aspects, the thread leader device 104 manages a set of one or more thread routers 106 in the thread network 118. In some aspects, the thread leader device 104 is self-elected. For example, when the thread leader device 104 becomes unavailable, the thread router 106 or the end device 102 is self-elected and promoted to be a thread leader device 104.

According to some aspects, a border router 108 connects thread devices in the thread network 118 and devices outside the thread network 112. For example, the border router 108 receives a packet from a thread router 106 and forwards the packet to the access point 112. For another example, the border router 108 receives a second packet from the access point 112 and forwards the packet to the thread router 106.

According to some aspects, the access point 112 may include electronic devices configured to operate based on a wide variety of wireless communication techniques such as, but are not limited to, techniques based on IEEE 802.11 standard, IEEE 802.15 standard, and one or more 3GPP standards, such as Release 15 (Rel-15), Release 16 (Rel-16), or Release 17 (Rel-17) or other 3GPP releases. The access point 112 may include, but is not limited to, a router device, a base station, and a mobile base station. The UE 105 may include an electronic device configured to operate using IEEE 802.11 standard, IEEE 802.15 standard, and/or one or more 3GPP releases, such as Release 15 (Rel-15), Release 16 (Rel-16), Release 17 (Rel-17), or other 3GPP releases. The UE 105 may include, but is not limited to, wireless communication devices, smartphones, laptops, desktops, tablets, personal assistants, monitors, televisions, wearable devices, Internet of Things (IoT) devices, vehicle communication devices, and the like. In some aspects, the access point 112 directly connects to the internet 116. The UE 114 may connect to the internet 116 directly or indirectly via the access point 112.

Figure 2:
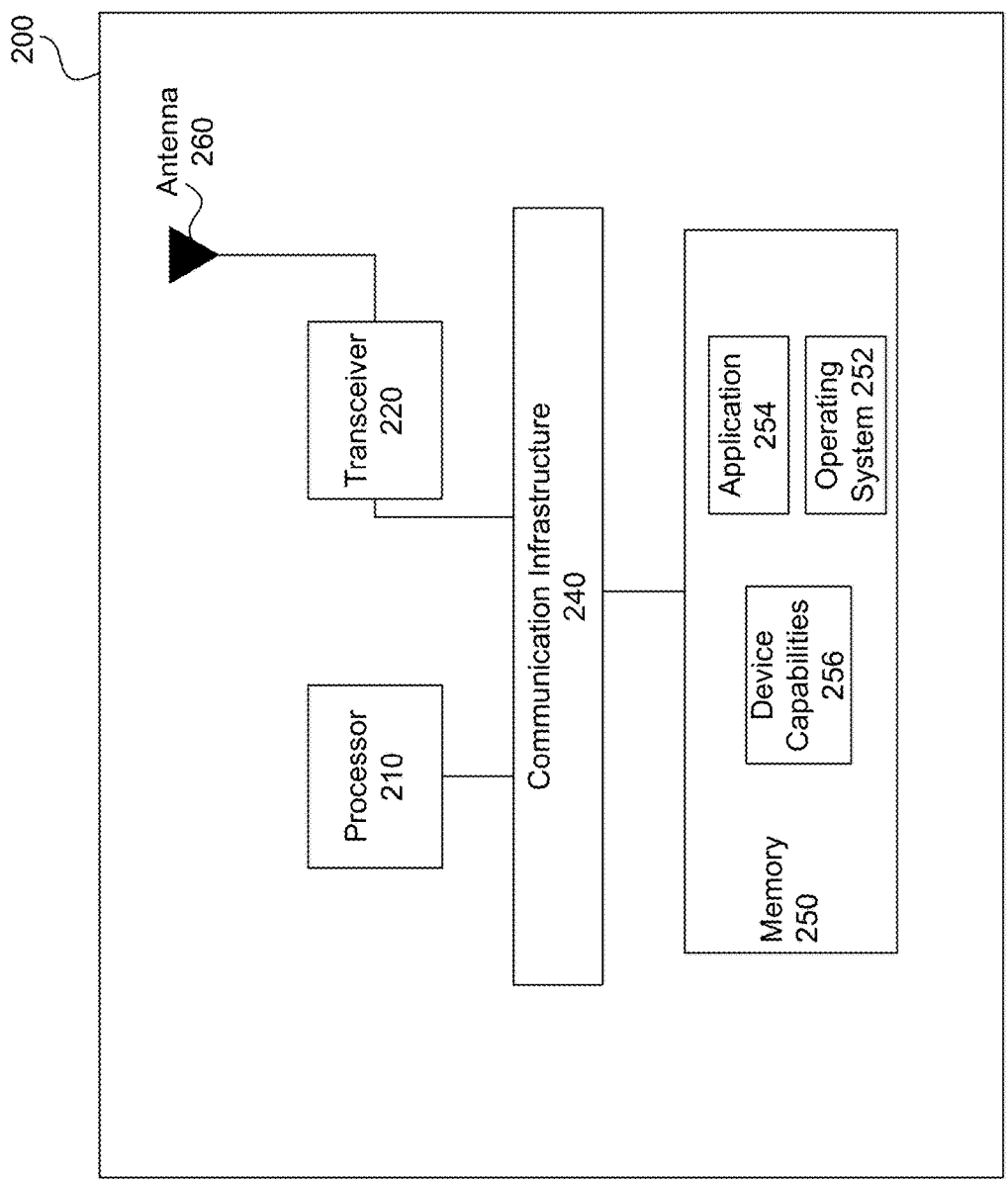
FIG. 2 illustrates a block diagram of an example system of an electronic device for the communication network, according to some aspects of the disclosure.

FIG. 2 illustrates a block diagram of an example system 200 of an electronic device implementing mechanisms for a thread network, according to some aspects of the disclosure. The system 200 may be any of the electronic devices (e.g., an end device 102, a thread leader device 104, a thread router 106, and a border router 108) of the thread network 118 of the system 100. System 200 includes a processor 210, one or more transceivers 220, a communication infrastructure 240, a memory 250, an operating system 252, an application 254, and one or more antennas 260. Illustrated systems are provided as exemplary parts of system 200, and system 200 may include other circuit(s) and subsystem(s). Also, although the systems of system 200 are illustrated as separate components, the aspects of this disclosure may include any combination of these, e.g., less, or more components.

The memory 250 may include random access memory (RAM) and/or cache, and may include control logic (e.g., computer software) and/or data. The memory 250 may include other storage devices or memory such as, but not limited to, a hard disk drive and/or a removable storage device/unit. According to some examples, the operating system 252 may be stored in the memory 250. The operating system 252 may manage transfer of data from the memory 250 and/or the one or more applications 254 to the processor 210 and/or the one or more transceivers 220. In some examples, the operating system 252 maintains one or more network protocol stacks (e.g., Internet protocol stack, cellular protocol stack, and the like) that may include a number of logical layers. At corresponding layers of the protocol stack, the operating system 252 includes control mechanisms and data structures to perform the functions associated with that layer.

According to some examples, the application 254 may be stored in the memory 250. The application 254 may include applications (e.g., user applications) used by wireless system 200 and/or a user of wireless system 200. The applications in the application 254 may include applications such as, but not limited to, Siri™, FaceTime™, Apple TV™, radio streaming, video streaming, remote control, and/or other user applications.

The system 200 may also include the communication infrastructure 240. The communication infrastructure 240 provides communication between, for example, the processor 210, the one or more transceivers 220, and the memory 250. In some implementations, the communication infrastructure 240 may be a bus. The processor 210, alone, or together with instructions stored in the memory 250 performs operations enabling system 200 of the thread network 118 of the system 100 to implement mechanisms for carrier-sense multiple access and carrier aggregation of thread devices, as described herein.

The one or more transceivers 220 transmit and receive communications signals support mechanisms for the carrier-sense multiple access and carrier aggregation of thread devices. Additionally, the one or more transceivers 220 transmit and receive communications signals that support mechanisms for measuring communication link(s), generating and transmitting system information, and receiving the system information. According to some aspects, the one or more transceivers 220 may be coupled to antenna 260. Antenna 260 may include one or more antennas that may be the same or different types. The one or more transceivers 220 allow system 200 to communicate with other devices that may be wired and/or wireless. In some examples, the one or more transceivers 220 may include processors, controllers, radios, sockets, plugs, buffers, and like circuits/devices used for connecting to and communication on networks. According to some examples, the one or more transceivers 220 include one or more circuits to connect to and communicate on wired and/or wireless networks.

According to some aspects of this disclosure, the one or more transceivers 220 may include a cellular subsystem, a WLAN subsystem, and/or a Bluetooth™ subsystem, each including its own radio transceiver and protocol(s) as will be understood by those skilled in the arts based on the discussion provided herein. In some implementations, the one or more transceivers 220 may include more or fewer systems for communicating with other devices.

In some examples, the one or more the transceivers 220 may include one or more circuits (including a WLAN transceiver) to enable connection(s) and communication over WLAN networks such as, but not limited to, networks based on standards described in IEEE 802.11.

Additionally, or alternatively, the one or more the transceivers 220 may include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, the transceiver 220 may include a Bluetooth™ transceiver.

Additionally, the one or more the transceivers 220 may include one or more circuits (including a cellular transceiver) for connecting to and communicating on cellular networks. The cellular networks may include, but are not limited to, 3G/4G/5G networks such as Universal Mobile Telecommunications System (UMTS), Long-Term Evolution (LTE), and the like. For example, the one or more transceivers 220 may be configured to operate according to one or more of Rel-15, Rel-16, Rel-17, or other releases of 3GPP standard.

According to some aspects of this disclosure, the processor 210, alone or in combination with computer instructions stored within the memory 250, and/or the one or more the transceiver 220, implements the methods and mechanisms discussed in this disclosure. For example, the processor 210, alone or in combination with computer instructions stored within the memory 250, and/or the one or more transceiver 220, implements mechanisms for the carrier-sense multiple access and carrier aggregation of thread devices. According to some aspects of this disclosure, the processor 210, alone or in combination with computer instructions stored within the memory 250, determines a first period of time for CCA checks. The processor 210, alone or in combination with computer instructions stored within the memory 250, determines a power distribution of the first period of time and determines that a channel is occupied in the first period of time, wherein the power distribution includes signal strengths of all symbol durations of the first period of time. For example, when the signal strength of at least one symbol duration of the first period of time are higher than a threshold, then the channel is determined to be occupied. In some aspects, the processor 210, alone or in combination with computer instructions stored within the memory 250, determines a second period of time within the first period of time based on the power distribution, where the channel is idle in the second period of time. For example, the signal strengths of all symbol durations of the second period of time are below the threshold. In some aspects, the processor 210, alone or in combination with computer instructions stored within the memory 250, may determine a third period of time based on the second period of time and determine that the channel is idle in the third period of time, wherein a length of a combination of the second and the third periods of time is equal to a size of the first period of time. The processor 210, alone or in combination with computer instructions stored within the memory 250, determines that the channel is idle and available for a transmission.

As discussed in more detail below with respect to FIGS. 3-8, processor 210 may implement different mechanisms for the carrier-sense multiple access and carrier aggregation of thread devices, as discussed with respect to the system 100 of FIG. 1.

Figure 3:
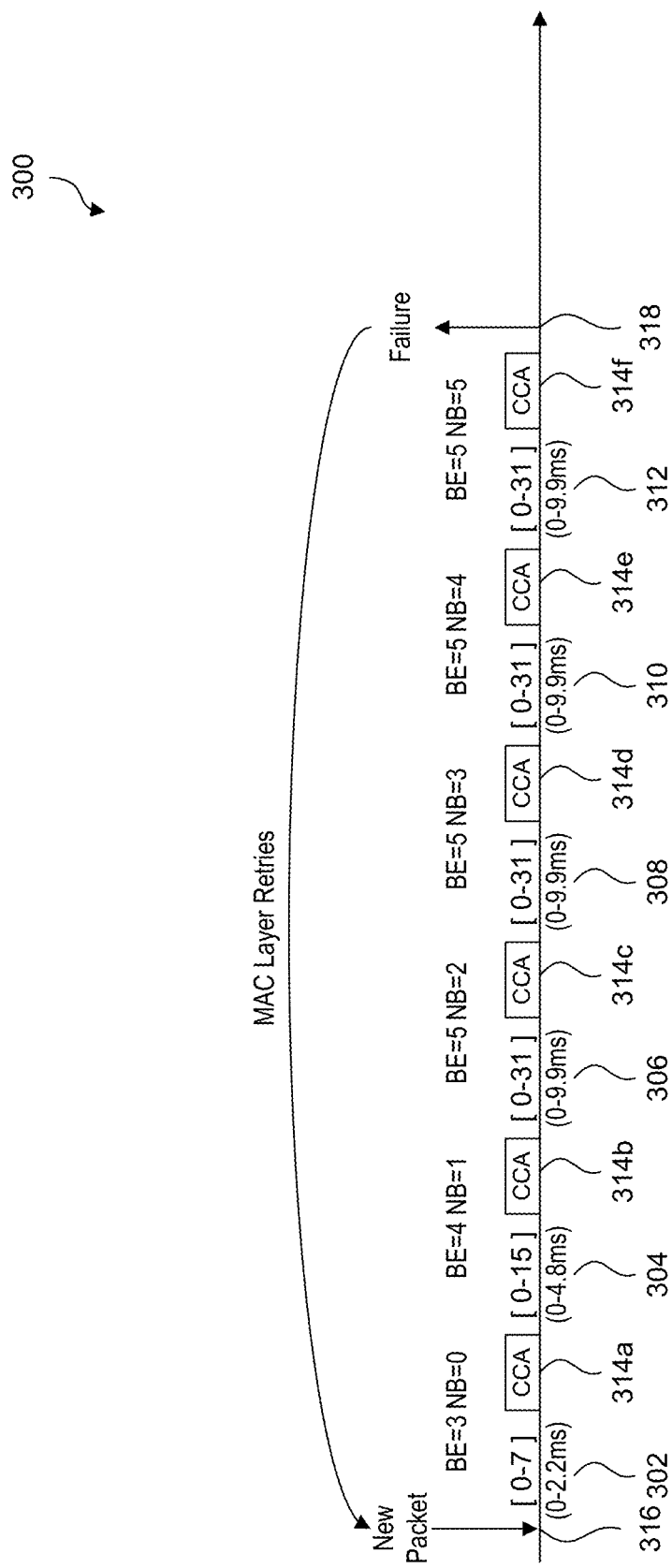
FIG. 3 illustrates an example of CCA checks of a thread device with back-off periods, according aspects of the disclosure.

FIG. 3 illustrates an example of CCA checks of a thread device with back-off periods. The thread device may be any of the one or more end devices 102, the one or more thread leader devices 104, the one or more thread router 106, and the one or more border router 108 described in FIG. 1. Example 300 is provided for the purpose of illustration only and does not limit the disclosed aspects.

Example 300 may include, but is not limited to, back-off periods 302, 304, 306, 308, 310, and 312, CCA periods 314a-f, a new packet arrival time 316, and an MAC layer retry failure time 318. The thread device receives a new packet at the new packet arrival time 316. In some aspects, applications of the thread device (e.g. application 254) generate the new packet, which requires transmission. In other aspects, the thread device receives the new packet from another communication device. After receiving the new packet, the thread device waits a back-off period 302 and performs a first CCA check in the first CCA period 314a. In the first CCA period 314a, the thread device scans a (wireless) channel to determine whether the channel is idle. In some aspects, the thread device determines a signal strength of the channel within the first CCA period 314a. In some aspects, the thread device may determine that the signal strength is below a threshold and therefore the channel is idle. The thread device subsequently transmits the new packet and no more CCA checks are required. In other aspects, the thread device may determine that the signal strength is above the threshold and therefore the channel is occupied. The thread device waits the back-off period 304 and performs a second CCA in a second CCA period 314b. In this manner, the thread device repeats the CCA periods 314 if the thread device determines that the channel is occupied. Otherwise, the thread device transmits the new packet. In some aspects, a predetermined number of CCA periods 314a-f are considered to be a MAC layer retry. For example, 6 CCA periods 314 may be considered to be a first MAC layer retry. If the thread device determines that the channel is occupied in a sixth CCA period 314f, the first MAC layer retry fails at the MAC layer retry failure time 318. In some aspects, the thread device may initiate a second MAC layer retry, which is similar to the first MAC layer retry. In some aspects, the thread device terminates the CCA checks after a predetermined number of MAC layer retries fail. For example, the thread device may terminate the CCA checks after a failure of a third MAC layer retry. In such a case, the thread device may drop the new packet.

According to some aspects, each of the back-off period 302, 304, 306, 308, 310, and 312 are characterized by a back-off exponent (BE) and a number of back-off (NB). In some aspects, the back-off periods 302, 304, 306, 308, 310, and 312 are random durations between 0 and $2^{BE}-1$ unit back-off periods. For example, the BE and the NB of the back-off period 302 are 3 and 0 respectively and a unit back-off period is 320 us. In such a case, the back-off period 302 is a random duration between 0 and 2.24 ms. In some aspects, the unit back-off period is 20 symbol durations.

According to some aspects, the BE and the NB increase by 1 after a CCA period 314 if the thread device determines that the channel is occupied in the CCA period 314. For example, the thread device may determine that the channel is occupied in the first CCA period 302. Therefore, the BE and the NB of the back-off period 304 are 4 and 1, respectively. In such a case, the back-off period 304 is a random duration between 0 and $2^4-1$ unit back-off periods. In this case, if the unit back-off period is 320 us as described above, the back-off period 304 is a random duration between 0 and 4.8 ms. In some aspects, the BE stops increasing after a predetermined number of CCA periods 314. For example, the BEs of the back-off periods 306, 308, 310, 312 are all 5.

According to some aspects, the thread device determines that a MAC layer retry fails if the NB is greater than a maximum NB value. For example, the maximum NB value may be 5. The thread device may determine that the channel is occupied in the sixth CCA period 314 and increase the NB from 5 to 6. In such a case, since the NB value is greater than the maximum NB value, the thread device determines that the MAC layer retry fails.

According to some aspects, the CCA periods 314 are predetermined durations. For example, the CCA periods 314 may be 128 us. In some aspects, the CCA periods 314 may include 8 symbol durations. In other aspects, the CCA periods 314 may be at least a duration of an RX/TX gap. For example, the duration of the RX/TX gap may be 192 us and/or 12 symbol durations. In such a case, the CCA period 314 is at least 192 us and/or 12 symbol durations.

Figure 4:
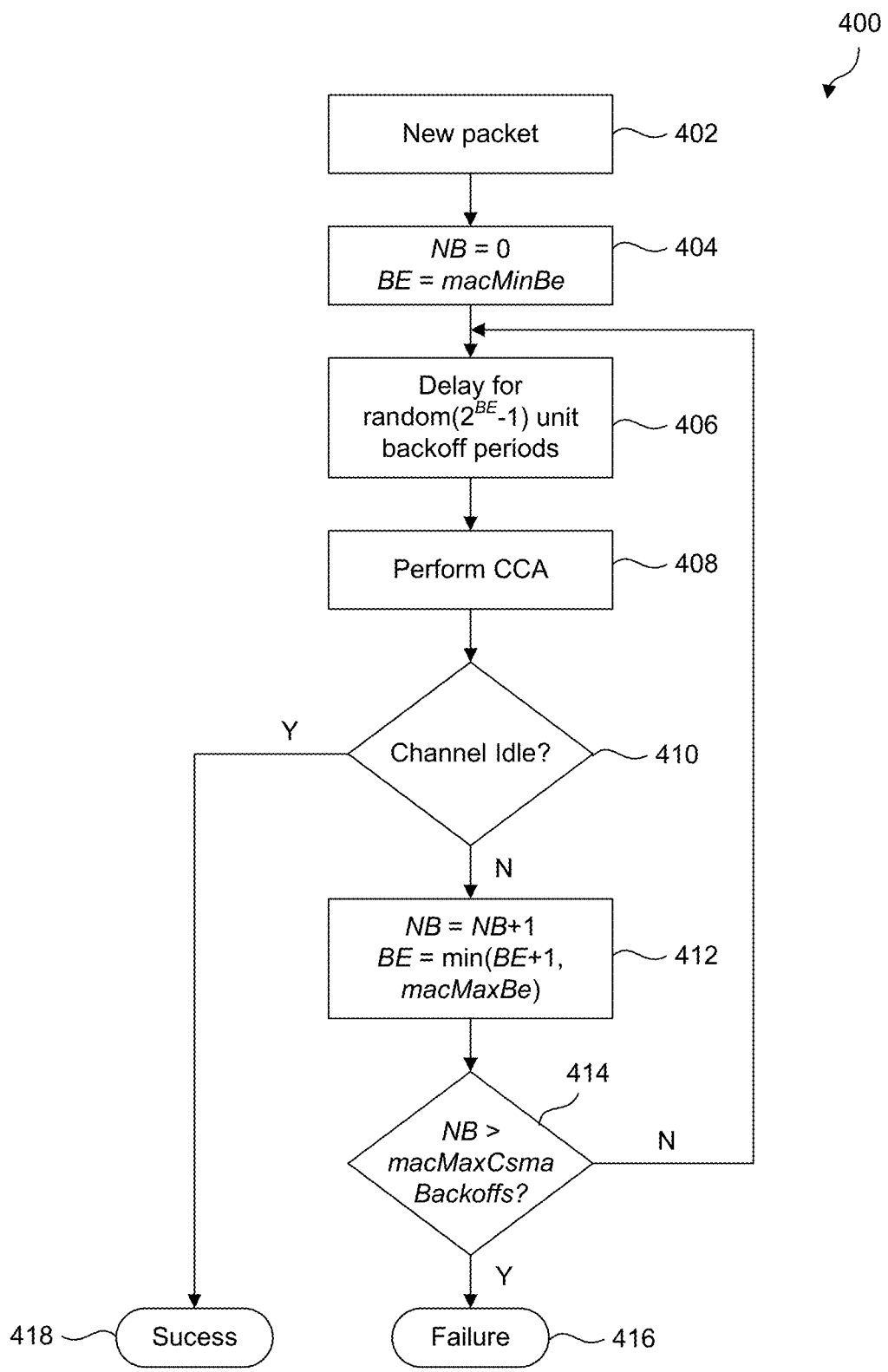
FIG. 4 illustrates an example method for the thread device performing carrier-sense multiple access and carrier aggregation with back-off periods, according aspects of the disclosure.

FIG. 4 illustrates an example method 400 for a thread device performing carrier-sense multiple access and carrier aggregation. As a convenience and not a limitation, FIG. 4 may be described with regard to elements of FIGS. 1, 2, and 9. Method 400 may represent the operation of an electronic device (for example, the one or more end devices 102, the one or more thread leader devices 104, the one or more thread router 106, and the one or more border router 108 of FIG. 1) implementing the carrier-sense multiple access and carrier aggregation. Method 400 may also be performed by system 200 of FIG. 2 and/or computer system 900 of FIG. 9. But method 400 is not limited to the specific aspects depicted in those figures and other systems may be used to perform the method, as will be understood by those skilled in the art. It is to be appreciated that not all operations may be needed, and the operations may not be performed in the same order as shown in FIG. 4.

At 402, the thread device detects a new packet arrival for transmission over the thread network. In some aspects, applications of the thread device generate the new packet, which requires transmission. In other aspects, the thread device receives the new packet from another device.

At 404, the thread device sets an NB to 0 and a BE to mac minimal back-off exponent (macMinBE). For example, the macMinBE is 3. As described above, the BE characterizes the length of the back-off periods, such as the back-off periods 302, 304, 306, 308, 310, and 312.

At 406, the thread device waits a back-off period. For example, the thread device waits the back-off period 302 of FIG. 3. As described above, the back-off period 302 is a random duration between 0 and $2^{BE}-1$ unit back-off periods. For example, the random duration is between 0 and $(2^3-1)$ unit back-off periods. The unit back period may be 320 us, so the random duration is between 0 and 2.24 ms for this instance.

At 408, the thread device performs a CCA check. In some aspects, the thread device scans a wireless channel for a fixed time duration. For example, the thread device scans the channel for 128 us and/or 8 symbol durations. The thread device detects a signal strength of the channel during the fixed time duration. In some aspects, the thread device determines the signal strength during the fixed duration by determining signal strengths of each symbol duration that make up the fixed time duration.

At 410, the thread device determines whether the channel is idle. In some aspects, the thread device may determine that the channel is idle if the signal strengths of the each symbol duration in the fixed time duration are below a threshold. If the channel idle, then control moves to 418.

At 418, the thread device determines that the CCA check is successful and the channel is clear for transmission. The thread device subsequently transmits the new packet over the thread network.

Referring back to 410, the thread device may determine that the channel is occupied if the signal strengths of at least one symbol duration in the fixed time duration is above the threshold. In such a case, the control moves to 412.

At 412, the thread device increases the NB and the BE by 1. For example, the thread device increases the NB from 0 to 1 and the BE from 3 to 4. In some aspects, if the BE is equal to a macMaxBe, the BE remains unchanged. For example, if the BE=5 and the maxMaxBe=5, the BE remains to be 5 in 412.

In 414, the thread device determines whether the NB is greater than a maximum MAC Carrier-sense multiple access (maxMacCsma). For example, the maxMacCsma is 5. If the NB is greater than the maxMacCsma, then control moves to 416. At 416, the thread device determines that the CCA checks fail in a MAC layer retry. In other words, the maxMacCsma sets a limit of a number of CCA checks that can be performed in the MAC layer retry.

Referring back to 414, if the thread device determines that the NB is less than or equal to the maxMacCsma, then control moves to 408, wherein the thread device performs another CCA check as described above.

Figure 5:
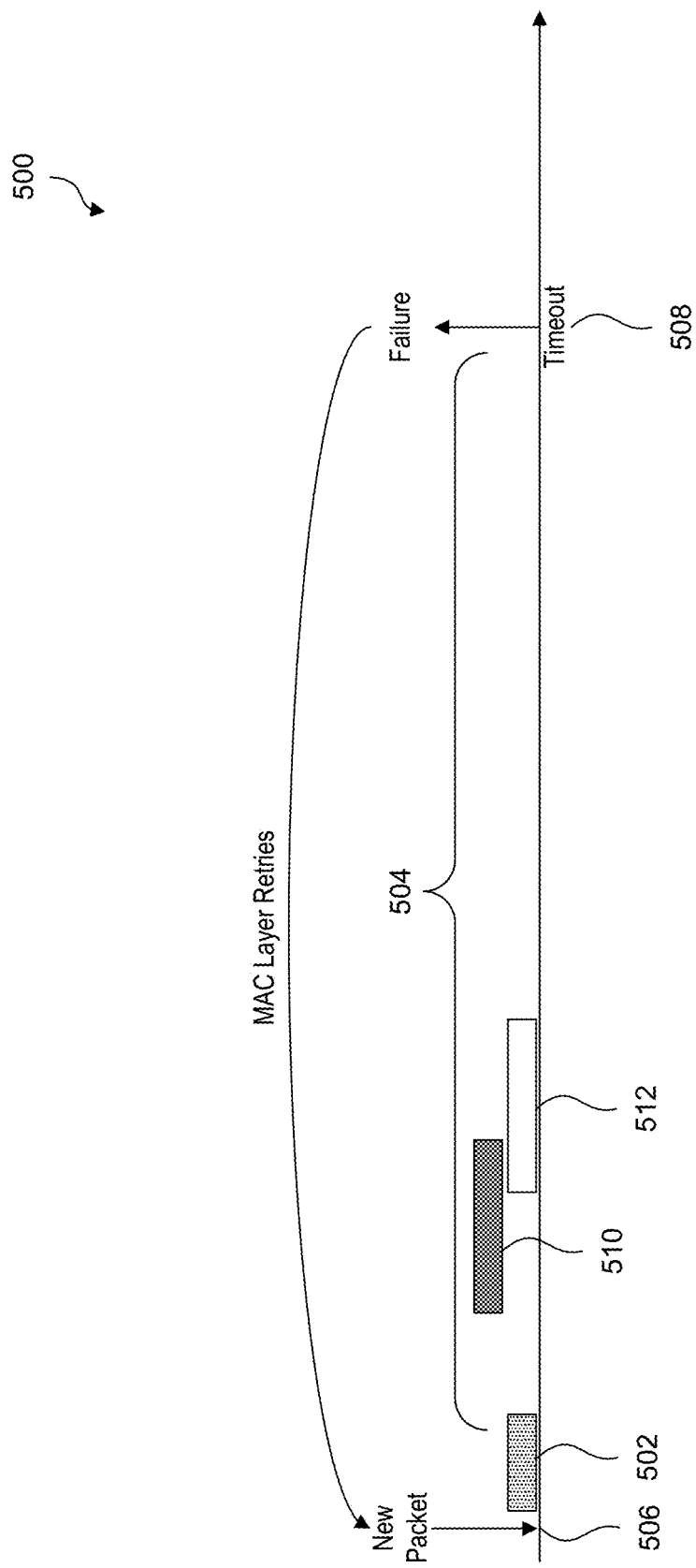
FIG. 5 illustrates an example of CCA checks of the thread device with a sliding window, according aspects of the disclosure.

FIG. 5 illustrates an example of CCA checks of a thread device with a sliding window. The thread device may be any of the one or more end devices 102, the one or more thread leader devices 104, the one or more thread router 106, and the one or more border router 108 described in FIG. 1. Example 500 is provided for the purpose of illustration only and does not limit the disclosed aspects. Example 500 may include, but is not limited to, a back-off period 502, a CCA period 504, a new packet arrival time 506, and a failure time 508. Similar to FIG. 3, the thread device receives a new packet to be transmitted at the new packet arrival time 506. The thread device then waits the back-off period 502. In some aspects, the back-off period 502 is characterized by a BE as described above. For example, the BE can be 5. In such a case, the back-off period 502 is a random duration between 0 and 31 unit back-off periods. In some aspects, the unit back-period is 320 us or 20 symbol durations. Therefore, the back-off period is a random duration between 0 and 9.92 ms for the example BE=5. For another example, the BE can be 7. In such a case, the back-off period 502 is a random duration between 0 and 127 unit back-off period, e.g., between 0 and 40.64 ms. In some aspects, the back-off period 502 has a default value. For example, the default value may be 7 unit back-off periods, which is 2.24 ms.

According to some aspects, the thread device performs a sliding window CCA in the CCA period 504. The thread device may determine that a channel is idle if signal strengths of a sliding window in the CCA period 504 are below a threshold based on a power distribution of the sliding window. The power distribution includes signal strengths of the symbol durations of the sliding window. For example, the thread device may determine that the channel is idle if the signal strengths of each symbol duration of the sliding window is below the threshold. In some aspects, the sliding window may locate in any position within the CCA period 504. For example, the thread device determines that the channel is occupied in the sliding window when the sliding window locates in a first position 510. The thread device then moves the sliding window to a second position 512. The thread device may determines that the channel is idle in the sliding window when the sliding window locates in the second position 512. According to some aspects, the sliding window has a predetermined duration. For example, length of the sliding window remains the predetermined duration when located in the first position 510 and the second position 512. Accordingly the sliding window can be considered to "slide" from position 510 to position 512 because the channel is determined to be occupied, and it is noted that the sliding window at position 512 overlaps in time with that at position 510. The predetermined duration may be 128 us and/or 8 symbol durations. In other aspects, the sliding window may be at least a duration of an RX/TX gap. For example, the duration of the RX/TX gap may be 192 us and/or 12 symbol durations. In such a case, each of the CCA period 314*a-f* is at least 192 us and/or 12 symbol durations.

According to some aspects, the thread device may determine that the channel is occupied in the sliding window no matter where the sliding window is located in the CCA period 504. In such a case, the sliding window has traveled the entire CCA period 501, so that the thread device determines that a MAC layer retry fails. The thread device may attempt multiple MAC layer retries. For example, the thread device may attempt 32 MAC layer retries before dropping the new packet. For another example, the thread device may attempt 4 MAC layer retries before dropping the packet. In some aspects, a number of MAC layer retries may depend on a packet arrival rate of the tread device or a traffic condition of a thread network, such as the thread network 118 in FIG. 1. For example, if the packet arrival rate of the thread device is high, the number of MAC layer retries may be set to be a small value, such as 4. This is because a large number of MAC layer retries may cause a backlog or dropping of newly arrival packets.

According to some aspects, the CCA period 504 is a predetermined period. For example, the thread device determines the CCA period 504 based on time distributions of CCA checks with back-off periods described in FIG. 3. In some aspects, the CCA period 504 is a total time period of all CCA periods 314 and upper bounds of back-off periods 304, 306, 308, 310, and 312 in a MAC layer retry. For example, each of the CCA period 314 is 128 us. Because the MAC layer retry includes 6 CCA periods 314, which is 768 us. For the back-off periods, the upper bound of the back-off period 304 is 4.8 ms and the upper bound of the back-off periods 306, 308, 310 and 312 is 9.92 ms. Therefore, a total time period is 45.248 ms. In such a case, the predetermined period of the CCA period 504 is the total time period 45.248 ms. The back-off period 302 is excluded when calculating the total time period because the back-off period 302 is an initial back-off period similar to the back-off period 504 in FIG. 5. In some aspects, the thread device may determine the CCA period 504 to be other durations. For example, the thread device may determine the CCA period 504 to be a predefined number of symbol durations.

Figure 6:
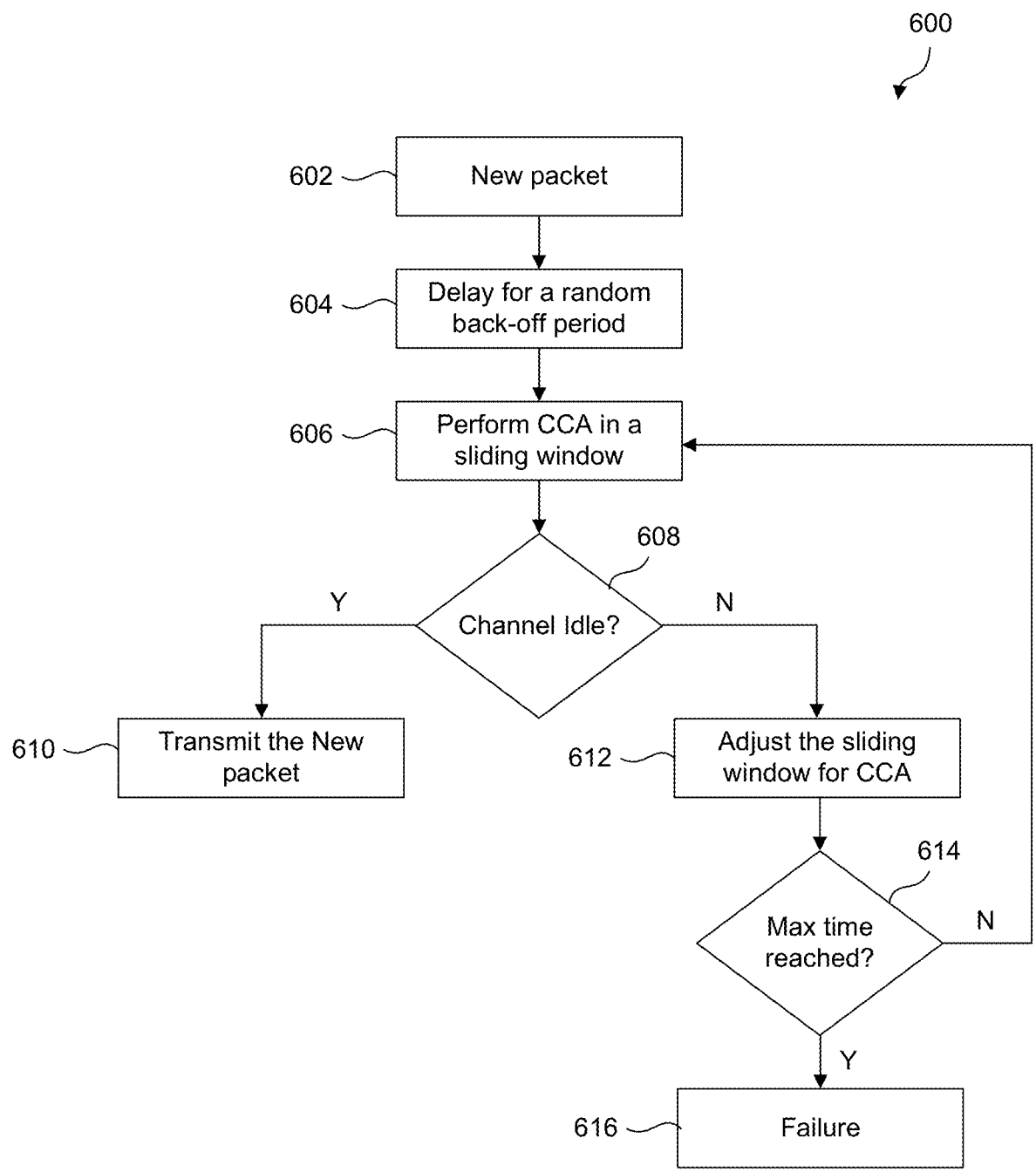
FIG. 6 illustrates an example method for the thread device performing carrier-sense multiple access and carrier aggregation with a sliding window, according aspects of the disclosure.

FIG. 6 illustrates an example method 600 for a thread device performing carrier-sense multiple access and carrier aggregation with a sliding window. As a convenience and not a limitation, FIG. 6 may be described with regard to elements of FIGS. 1, 2, and 9. Method 600 may represent the operation of an electronic device (for example, the one or more end devices 102, the one or more thread leader devices 104, the one or more thread router 106, and the one or more border router 108 of FIG. 1) implementing the carrier-sense multiple access and carrier aggregation. Method 600 may also be performed by system 200 of FIG. 2 and/or computer system 900 of FIG. 9. But method 600 is not limited to the specific aspects depicted in those figures and other systems may be used to perform the method, as will be understood by those skilled in the art. It is to be appreciated that not all operations may be needed, and the operations may not be performed in the same order as shown in FIG. 6.

At 602, the thread device detects a new packet arrival. In some aspects, application(s) (e.g., application 254) of the thread device generate the new packet, which requires transmission. In other aspects, the thread device receives the new packet from another device.

At 604, the thread device waits for a random back-off period. In some aspects, the random back-off period is the back-off period 502 described in FIG. 5.

At 606, the thread device performs a CCA check of a channel in a sliding window. In some aspects, the sliding window has a predetermined duration and is located in the CCA period 504 as described in FIG. 5. For example, the sliding window may initially locate at the beginning of the CCA period 504, for example at position 510. In some aspects, the sliding window includes a number of symbol durations.

At 608, the thread device determines whether the channel is idle based on the CCA check in 606. In some aspects, the thread device determines that the channel is idle if signal strengths of the symbol durations in the sliding window are below a threshold. In such a case where the channel is determined idle, then control moves to 610.

At 610, the thread device transmits the new packet on the channel.

Referring back to 608, the thread device may determine that the channel is occupied (not idle) if signal strengths of at least one symbol duration of the sliding window is above the threshold. In such a case where the channel is occupied, then control moves to 612.

At 612, the thread device adjusts a position of the sliding window from the first position 510 to the second position 512 It is noted that the sliding window at position 512 has some overlap with that at position 510. In some aspects, the thread device adjusts the position based on a power distribution of the sliding window based on the CCA check in 606. Detail of adjusting the position is described below in FIGS. 7A, 7B, and 8.

At 614, the thread device determines whether the sliding window is still in the CCA period 504 after adjusting the position of the sliding window in 612 to the second position. For example, a part of the sliding window may locate outside the CCA period 504. In other words, the sliding window can "slide" out of the CCA period 504. In such a case, the control moves to 616.

At 616, the thread device determines that a MAC layer retry fails. The thread device may attempt multiple MAC layer retries. For example, the thread device may attempt 32 MAC layer retries before dropping the new packet. For another example, the thread device may attempt 4 MAC layer retries before dropping the packet. In some aspects, a number of MAC layer retries may depend on a packet arrival rate of the tread device or a traffic condition of a thread network, such as the thread network 118 in FIG. 1. For example, if the packet arrival rate of the thread device is high, the number of MAC layer retries may be set to be a small value, such as 4. This is because a large number of MAC layer retries may cause a backlog or dropping of newly arrival packets.

Referring back to 614, the thread device may determine that the sliding window is still in the CCA period 504. In such a case, the control moves to 606.

At 606, the thread device performs another CCA check in the position of the sliding window after adjusting.

FIG. 7A illustrates an example 700A of a thread device adjusting a position of a sliding window. The thread device may be any of the one or more end devices 102, the one or more thread leader devices 104, the one or more thread router 106, and the one or more border router 108 described in FIG. 1. Example 700A is provided for the purpose of illustration only and does not limit the disclosed aspects. Example 700A includes a sliding window 710, which includes periods 702, 704, and 706. Example 700A also includes a sliding window 712, which includes the periods 704, the period 706, and a period 708. In some aspects, the sliding window 710 is an initial position of a sliding window and the sliding window 712 is an adjusted position of the sliding window, similar to sliding window positions 510 and 512, respectively. The sliding windows 710 and 712 both include N symbol durations. In some aspects, the periods 702, 706, and 708 includes one or more symbol durations.

According to some aspects, the thread device performs a CCA check of a channel in the sliding window 710. The thread device determines that the channel is occupied in the sliding window 710 because signal strength of at least one symbol duration of the sliding window 710 is above a threshold. In some aspects, the thread device determines a first and a last occupied symbol durations in the sliding window 710 that have signal strengths higher than the threshold. In other words, the channel is idle before the first occupied symbol duration or after the last occupied symbol duration in the sliding window 710. The thread device determines that the period 704 to be a period from a start of the first occupied symbol duration to an end of the last occupied symbol duration. In some aspects, the channel is occupied only in a single symbol duration in the sliding window 710. In such a case, the period 704 is the single symbol duration.

According to some aspects, the thread device determines the periods 702 and 706 based on the period 704. For example, the period 702 is a period between a beginning of sliding window 710 and the beginning of the period 704. The period 706 is a period between the end of the period 704 and an end of the sliding window 710.

According to some aspects, the thread device determines that the period 706 includes K symbol durations. As a reminder, in aspects, an idle channel is to be observed for N symbol durations to pass the CCA check. Based on this, the thread device determines that the period 708 to be N-K symbol durations following the sliding window 710. For example, the period 708 includes N-K symbol durations following the last symbol duration of the sliding window 710. Because a total length of the periods 706 and 708 is N symbol duration, the periods 706 and 708 form a new sliding window position, indicated by sliding window 712. In other words, the thread device "slides" the sliding window 710 for the CCA check to the sliding window 712, which includes of the periods 706 and 708.

According to some aspects, the thread device performs a CCA check in the sliding window 712. The thread device may determine that the channel is idle in the sliding window 712 if signal strengths of all symbol durations in the sliding window 712 are below the threshold. In some aspects, the thread device performs the CCA check in the sliding window 712 by performing a CCA check in the period 708. This is because the thread device already knows that the channel is idle in the period 706. If the channel is idle in the period 708, the channel is idle in the sliding window 712. In such a case, the thread device performs transmission on the channel.

According to some aspects, the thread device may determine the period 706 by locating the last occupied symbol duration in the sliding window 710 that has a signal strength higher than the threshold. In such a case, the period 706 is a period between an end of the last occupied symbol duration and the end of the sliding window 710. In this way, the thread device may determine the sliding window 712 and the periods 706 and 708 without determining the periods 702 and 704.

According to some aspects, the period 706 may be empty. In other words, the period 706 may include zero symbol duration. This may be true if the last symbol duration of the sliding window 710 has a signal strength higher than the threshold. In such a case, the period 708 has N symbol durations following the sliding window 710. The sliding window 712 is the period 708.

FIG. 7B illustrates another example of a thread device adjusting a position of a sliding window. The thread device may be any of the one or more end devices 102, the one or more thread leader devices 104, the one or more thread router 106, and the one or more border router 108 described in FIG. 1. Example 700B is provided for the purpose of illustration only and does not limit the disclosed aspects. Similar to the example 700A, example 700B includes a sliding window 710, which includes periods 702, 704, and 706. Example 700B also includes a sliding window 712, which includes periods 706 and 708. In some aspects, the sliding window 710 is an initial position of a sliding window and the sliding window 712 is an adjusted position of the sliding window. The sliding windows 710 and 712 both include N symbol durations. In some aspects, the periods 702, 706, and 708 includes one or more symbol durations.

According to some aspects, similar to FIG. 7A, the thread device determines the period 708 based on a CCA check of a channel in the sliding window 710 and the indication of an occupied channel in period 704. The thread device then performs a CCA check in the period 708. The thread device may determine that the channel is occupied (not idle) in the period 708. In some aspects, the thread device determines a first and a last occupied symbol durations in the period 708 that have signal strengths higher than a threshold. For example, the thread device determines a period 716 within the period 708 to be a period between a start of the first occupied symbol duration and an end of the last occupied symbol duration. In some aspects, the channel is occupied only in a single symbol duration in the period 708. In such a chase, the period 716 is the single symbol duration.

According to some aspects, the thread device determines periods 714 and 718 based on the period 716. For example, the period 714 is a period between a beginning of period 708 and the beginning of the period 716. The period 718 is a period between the end of the period 716 and an end of the period 708.

According to some aspects, the thread device determines that the period 718 includes L symbol durations. Based on this, the thread device determines that a period 720 to be N-L symbol durations following the sliding window 712. For example, the period 720 includes N-L symbol durations following the last symbol duration of the sliding window 712. Because a total length of the periods 718 and 720 is N symbol duration, the periods 718 and 720 form a new sliding window 722, such that the thread device "slides" the sliding window 712 to the sliding window 722, which has the periods 718 and 720 that total N symbol durations.

According to some aspects, the thread device performs a CCA check in the sliding window 722. The thread device determines that the channel is idle in the sliding window 722 if signal strengths of all symbol durations in the sliding window 722 are below the threshold. In some aspects, the thread device performs the CCA check in the sliding window 722 by performing a CCA check in the period 720. This is because the thread device already knows that the channel is idle in the period 718. If the channel is idle in the period 720, the channel is idle in the sliding window 722. In such a case, the thread device performs transmission on the channel.

According to some aspects, the thread device may determine the period 718 by locating the last occupied symbol duration in the sliding window 712 that has a signal strength higher than the threshold. In such a case, the period 718 is a period between an end of the last occupied symbol duration and the end of the sliding window 712. In this way, the thread device may determine the sliding window 722 to include the periods 718 and 720, without determining the periods 714 and 716.

According to some aspects, the period 718 may be empty. In other words, the period 718 may include zero symbol duration. This may be true if the last symbol duration of the sliding window 712 has a signal strength higher than the threshold. In such a case, the period 720 has of N symbol durations following the sliding window 712 so that the sliding window 722 is the period 720.

Figure 8:
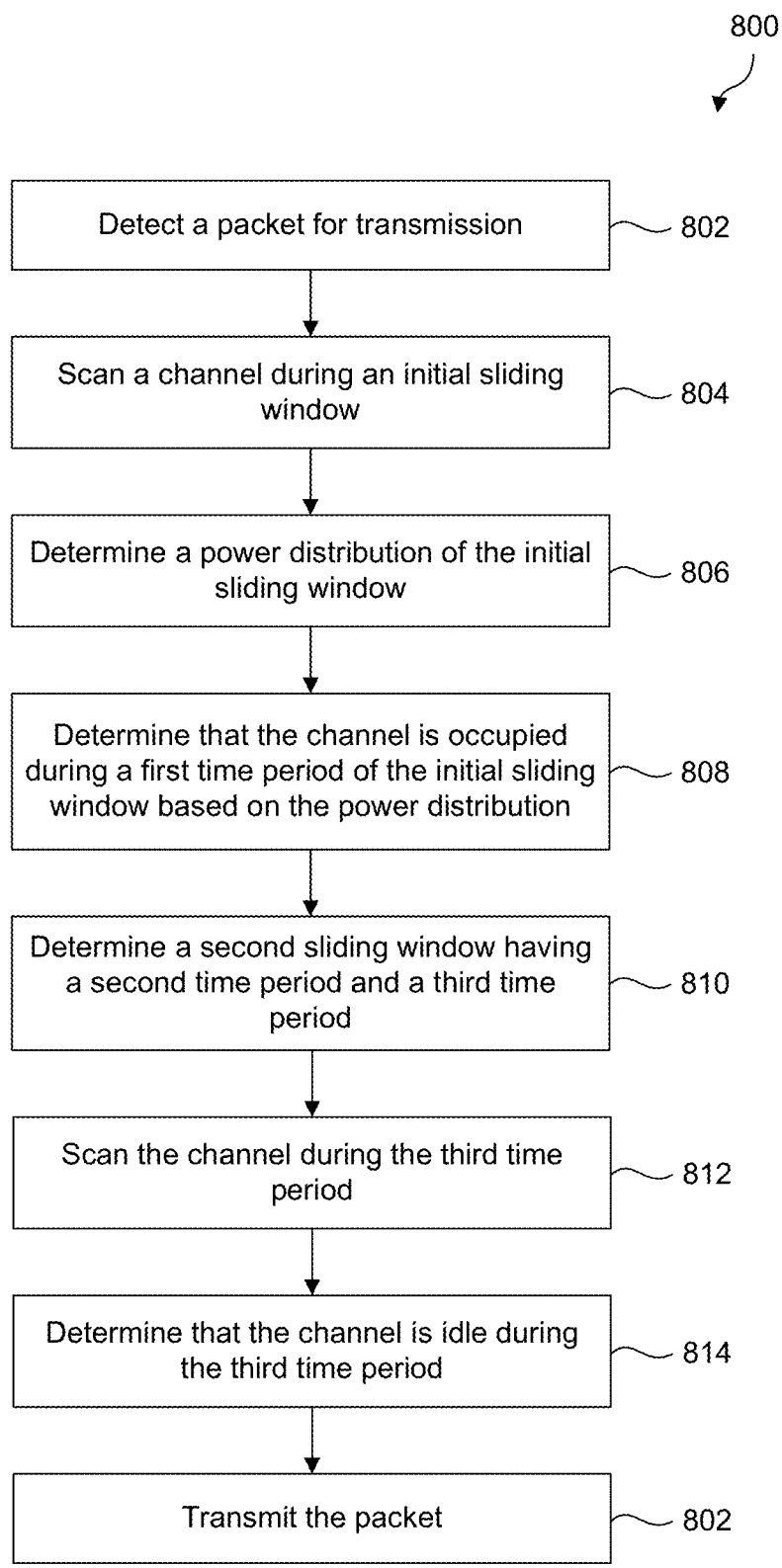
FIG. 8 illustrates an example method for the thread device adjusting a sliding window position to transmit a packet according aspects of the disclosure.

FIG. 8 illustrates an example method 800 for a thread device adjusting a sliding window position to transmit a packet as partly described in 612 of FIG. 6. As a convenience and not a limitation, FIG. 8 may be described with regard to elements of FIGS. 1, 2, and 9. Method 900 may represent the operation of an electronic device (for example, the one or more end devices 102, the one or more thread leader devices 104, the one or more thread router 106, and the one or more border router 108 of FIG. 1) implementing adjustment of the sliding window position as described in 612 of FIG. 6. Method 800 may also be performed by system 200 of FIG. 2 and/or computer system 900 of FIG. 9. But method 800 is not limited to the specific aspects depicted in those figures and other systems may be used to perform the method, as will be understood by those skilled in the art. It is to be appreciated that not all operations may be needed, and the operations may not be performed in the same order as shown in FIG. 8.

At 802, the thread device detects the packet for transmission. In some aspects, applications of the thread device generate the packet, which requires transmission. In other aspects, the thread device receives the packet from another device.

At 804, the thread device scans a channel during an initial sliding window. For example, the thread device scans the channel using the transceiver 220 shown in FIG. 2. The initial sliding window may be the sliding window in the first position 510 of FIG. 5 or the sliding window 710 of FIG. 7A or 7B.

At 806, thread device may determine a power distribution of the initial sliding window based on the channel scan of 804. The power distribution includes signal strengths of all symbol durations of the initial sliding window. The thread device further determines whether each of the signal strengths are above or below a threshold.

At 808, the thread device determines that the channel is occupied in a first period of the initial sliding window. For example, the thread device may determine that a signal strength of at least one symbol durations of a first period of the initial sliding window is above the threshold.

At 810, the thread device determines a second sliding window. The second sliding window includes a second and a third time periods. The second time period overlaps with the initial sliding window. For example, the second sliding window may be sliding window 712 and the second time period may be the time period 706 of FIG. 7. The thread device determines a length of the third time period based on the power distribution of the initial sliding window. For example, the third time period may be the time period 708 of FIG. 7. As explained above, assuming the time period 706 is K symbol durations, the period 708 to be N-K symbol durations for the portion of the (second) sliding window 712 that requires channel monitoring.

At 812, the thread device scans the channel during the third time period, e.g. time period 708 of the second sliding window 712. For example, the thread device scans the channel using the transceiver 220 shown in FIG. 2.

At 814, the thread device determines that the channel is idle during the third time period (e.g, time period 708). For example, the thread device may determine that signal strengths of all symbol durations of the third time period are below the threshold.

At 816, the thread device transmits the packet on the channel upon determining that the channel is idle during the third time period.

Figure 9:
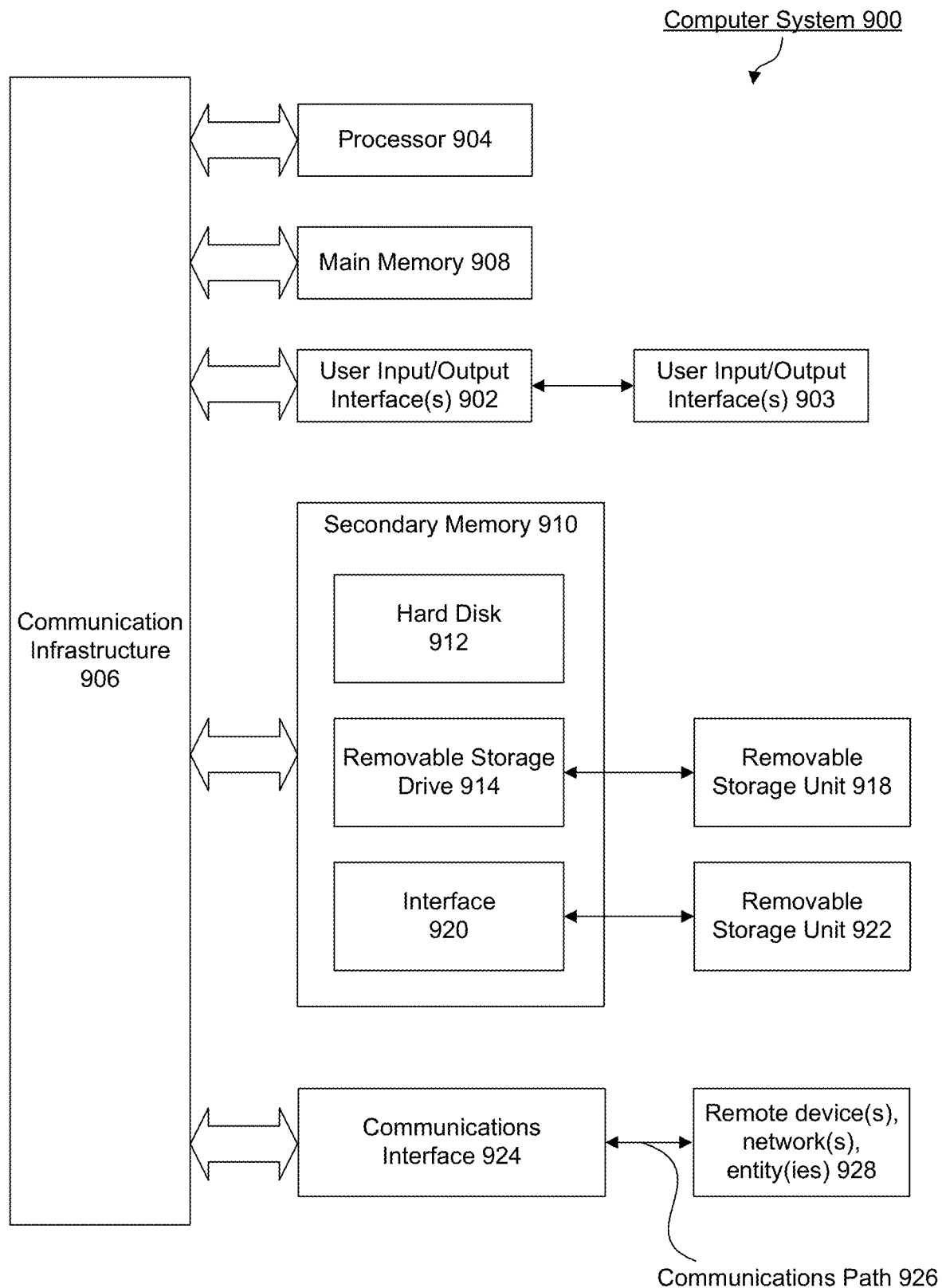
FIG. 9 is an example computer system for implementing some aspects of the disclosure or portion(s) thereof.

Various aspects may be implemented, for example, using one or more computer systems, such as computer system 900 shown in FIG. 9. Computer system 900 may be any well-known computer capable of performing the functions described herein such as the one or more end devices 102, the one or more thread leader devices 104, the one or more thread router 106, and the one or more border router 108 of FIG. 1, or 200 of FIG. 2. Computer system 900 includes one or more processors (also called central processing units, or CPUs), such as a processor 904. Processor 904 is connected to a communication infrastructure 906 (e.g., a bus.) Computer system 900 also includes user input/output device(s) 903, such as monitors, keyboards, pointing devices, etc., that communicate with communication infrastructure 906 through user input/output interface(s) 902. Computer system 900 also includes a main or primary memory 908, such as random access memory (RAM). Main memory 908 may include one or more levels of cache. Main memory 908 has stored therein control logic (e.g., computer software) and/or data.

Computer system 900 may also include one or more secondary storage devices or memory 910. Secondary memory 910 may include, for example, a hard disk drive 912 and/or a removable storage device or drive 914. Removable storage drive 914 may be a floppy disk drive, a magnetic tape drive, a compact disk drive, an optical storage device, tape backup device, and/or any other storage device/drive.

Removable storage drive 914 may interact with a removable storage unit 918. Removable storage unit 918 includes a computer usable or readable storage device having stored thereon computer software (control logic) and/or data. Removable storage unit 918 may be a floppy disk, magnetic tape, compact disk, DVD, optical storage disk, and/any other computer data storage device. Removable storage drive 914 reads from and/or writes to removable storage unit 918 in a well-known manner.

According to some aspects, secondary memory 910 may include other means, instrumentalities or other approaches for allowing computer programs and/or other instructions and/or data to be accessed by computer system 900. Such means, instrumentalities or other approaches may include, for example, a removable storage unit 922 and an interface 920. Examples of the removable storage unit 922 and the interface 920 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 900 may further include a communication or network interface 924. Communication interface 924 enables computer system 900 to communicate and interact with any combination of remote devices, remote networks, remote entities, etc. (individually and collectively referenced by reference number 928). For example, communication interface 924 may allow computer system 900 to communicate with remote devices 928 over communications path 926, which may be wired and/or wireless, and which may include any combination of LANs, WANs, the Internet, etc. Control logic and/or data may be transmitted to and from computer system 900 via communication path 926.

The operations in the preceding aspects may be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 900, main memory 908, secondary memory 910 and removable storage units 918 and 922, as well as tangible articles of manufacture embodying any combination of the foregoing. Such control logic, when executed by one or more data processing devices (such as computer system 900), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 9. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A wireless device, comprising:
a transceiver configured to communicate with a second wireless device; and
a processor communicatively coupled to the transceiver and configured to:
detect a packet for transmission;
scan, using the transceiver, a channel during an initial sliding window, the initial sliding window having N symbol durations;
determine a power distribution of the initial sliding window based on the scan;
determine that the channel is occupied during a first time period of the initial sliding window based at least on the power distribution;
determine a second sliding window having a second time period and a third time period, the second time period overlapping with the initial sliding window, and a length of the third time period is determined based at least on the power distribution;
scan, using the transceiver, the channel during the third time period;
determine that the channel is idle during the third time period of the second sliding window; and
transmit, using the transceiver, the packet to the second wireless device on the channel responsive to the third time period being idle.

2. The wireless device of claim 1, wherein the wireless device and the second wireless device are thread devices in a mesh network.

3. The wireless device of claim 2, wherein the mesh network is an 802.15.4 based network.

4. The wireless device of claim 1, wherein the power distribution includes signal strengths of the channel for the N symbol durations.

5. The wireless device of claim 4, wherein the processor is further configured to determine that the channel is occupied during the first time period by determining that a signal strength of at least one of the N symbol durations of the first time period is above a threshold.

6. The wireless device of claim 5, wherein a signal strength of a last symbol duration of the first time period is above the threshold.

7. The wireless device of claim 1, wherein, to determine the third time period, the processor is further configured to:
determine the second time period based on the power distribution of the initial sliding window, wherein the second time period has M continuous symbol durations within the initial sliding window having signal strengths that are lower than or equal to a threshold; and
determine the third time period to be N-M continuous symbol durations following the second time period, wherein the M continuous symbol durations include a last symbol duration of the initial sliding window.

8. The wireless device of claim 1, wherein the processor is further configured to determine that the channel is idle during the third time period by determining that signal strengths of each symbol duration in the third time period are lower than or equal to a threshold.

9. A method of a wireless device, comprising:
detecting a packet for transmission;
scanning a channel during an initial sliding window, the initial sliding window having N symbol durations;
determining a power distribution of the initial sliding window based on the scanning;
determining that the channel is occupied during a first time period of the initial sliding window based at least on the power distribution;
determining a second sliding window having a second time period and a third time period, the second time period overlapping with the initial sliding window, and determining a length of the third time period based at least on the power distribution;
scanning the channel during the third time period;
determining that the channel is idle during the third time period of the second sliding window; and
transmitting the packet to a second wireless device on the channel responsive to the third time period being idle.

10. The method of claim 9, wherein the wireless device and the second wireless device are thread devices in a mesh network.

11. The method of claim 10, wherein the mesh network is an 802.15.4 based network.

12. The method of claim 9, wherein the power distribution includes signal strengths of the channel for the N symbol durations.

13. The method of claim 12, wherein the determining that the channel is occupied during the first time period further comprises determining that a signal strength of at least one of the N symbol durations of the first time period is above a threshold.

14. The method of claim 13, wherein a signal strength of a last symbol duration of the first time period is above the threshold.

15. The method of claim 9, wherein the determining the third time period further comprises:
determining the second time period based on the power distribution of the initial sliding window, wherein the second time period has M continuous symbol durations within the initial sliding window having signal strengths that are lower than or equal to a threshold; and
determining the third time period to be N-M continuous symbol durations following the second time period, wherein the M continuous symbol durations include a last symbol duration of the initial sliding window.

16. The method of claim 9, wherein the determining that the channel is idle during the third period comprises determining that signal strengths of the N symbol durations in the third time period are lower than or equal to a threshold.

17. A non-transitory computer-readable medium storing instructions that, when executed by a processor of an electronic device, cause the processor to perform operations, the operations comprising:
detecting a packet for transmission;
scanning, using a transceiver, a channel during an initial sliding window, the initial sliding window having N symbol durations;
determining a power distribution of the initial sliding window based on the scanning;
determining that the channel is occupied during a first time period of the initial sliding window based at least on the power distribution;
determining a second sliding window having a second time period and a third time period, the second time period overlapping with the initial sliding window, and determining a length of the third time period based at least on the power distribution;

scanning, using the transceiver, the channel during the third time period;

determining that the channel is idle during the third time period of the second sliding window; and transmitting, using the transceiver, the packet to a wireless device on the channel responsive to the third time period being idle.

18. The computer-readable medium of claim 17, wherein the power distribution includes signal strengths of the channel for the N symbol durations.

19. The computer-readable medium of claim 17, wherein the determining the third time period further comprises:

determining the second time period based on the power distribution of the initial sliding window, wherein the second time period has M continuous symbol durations within the initial sliding window having signal strengths that are lower than or equal to a threshold; and determining the third time period to be N-M continuous symbol durations following the second time period.

20. The computer-readable medium of claim 19, wherein the M continuous symbol durations include a last symbol duration of the initial sliding window.

* * * * *